J. W. ARNEY.
TOY VEHICLE.
APPLICATION FILED MAR. 19, 1909.
947,780.
Patented Feb. 1, 1910.
2 SHEETS—SHEET 1.
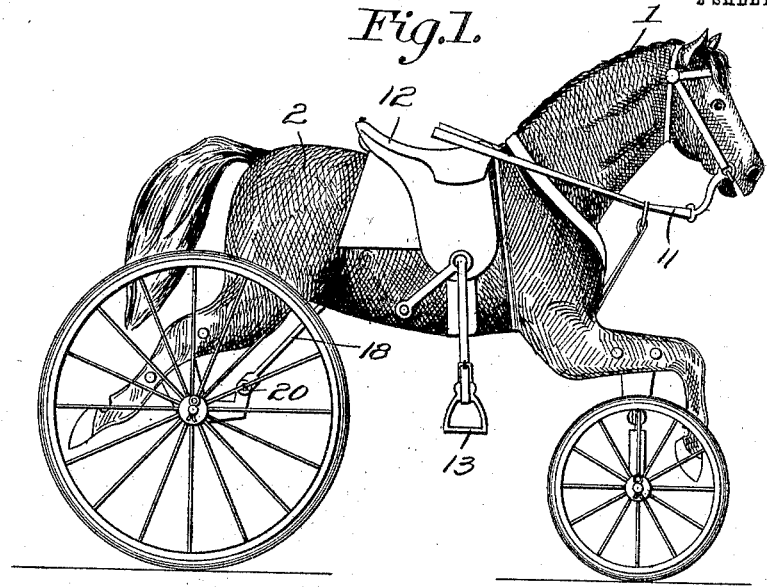
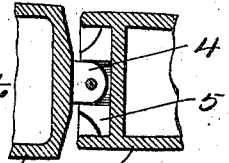
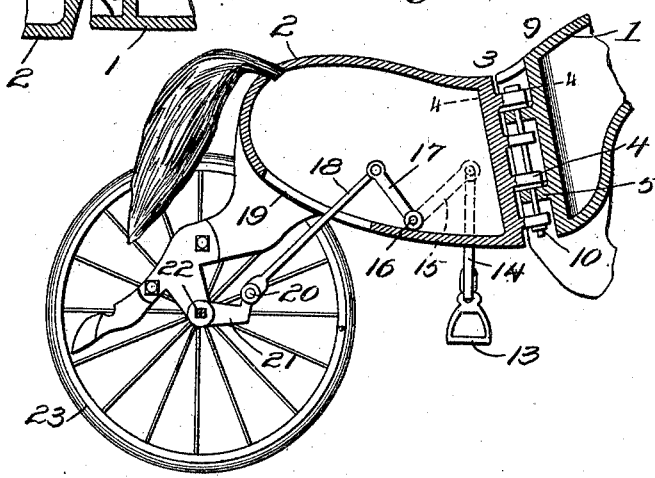
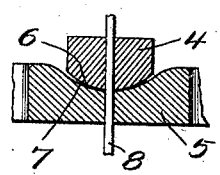
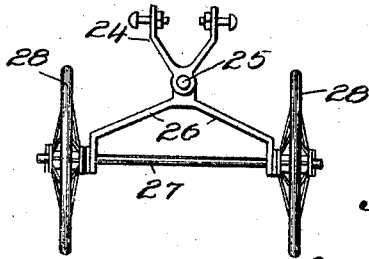
Inventor
John W. Arney
By Victor J. Evans
Attorney
Witnesses J. W. ARNEY.
TOY VEHICLE.
APPLICATION FILED MAR. 19, 1909.
947,780.
Patented Feb. 1, 1910.
2 SHEETS—SHEET 2.
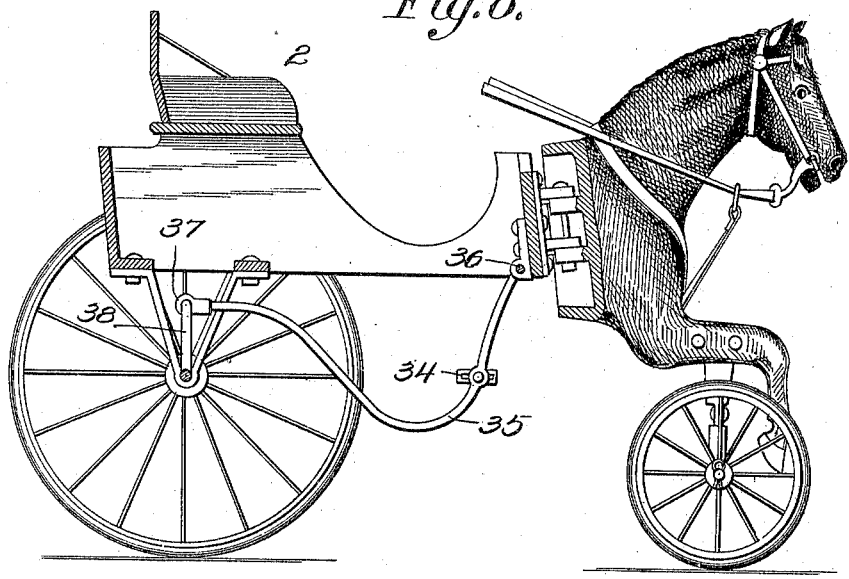
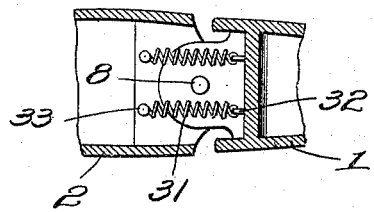
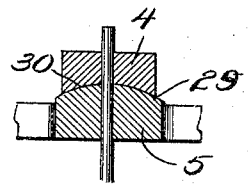
Inventor
John W Arney
Witnesses
Phil E. Barnes
R. M. Smith
By Victor J. Evans,
Attorney

UNITED STATES PATENT OFFICE.

JOHN W. ARNEY, OF MENDON, MICHIGAN, ASSIGNOR TO ARNEY SPECIALTY COMPANY, OF PORT HURON, MICHIGAN, A CORPORATION OF MICHIGAN.

TOY VEHICLE.

947,780.  Specification of Letters Patent.  Patented Feb. 1, 1910.

Application filed March 19, 1909. Serial No. 484,381.

*To all whom it may concern:*

Be it known that I, JOHN W. ARNEY, a citizen of the United States, residing at Mendon, in the county of St. Joseph and State of Michigan, have invented new and useful Improvements in Toy Vehicles, of which the following is a specification.

The invention relates to toy vehicles, the object of the invention being to provide a wheeled vehicle of the class described in the nature of a hobby-horse or resembling either a horse or other animal alone or coupled with a vehicle body, the device as a whole comprising front and rear sections which are connected to each other by a novel form of joint, which enables the sections to be turned relatively to each other and which, by reason of the peculiar construction of the joint, which is self-centering, insuring the travel of the device in a straight line while permitting the sections to be turned one relatively to the other for steering purposes. The construction also insures the return of the two sections into alinement with each other when the steering element is released. The invention also contemplates, in combination with the foregoing, means for manually propelling the vehicle.

With the above and other objects in view, the nature of which will more fully appear as the description proceeds, the invention consists in the novel construction, combination and arrangement of parts herein fully described, illustrated and claimed.

In the accompanying drawings: Figure 1 is a side elevation of one form of the vehicle. Fig. 2 is a vertical longitudinal section through the same. Fig. 3 is a front elevation of the steering wheels and the parts by which said wheels are connected to the body. Fig. 4 is a detail horizontal section, taken through the self-centering joint. Fig. 5 is a detail vertical section, taken through a portion of said joint. Fig. 6 is a vertical longitudinal section, showing another form of vehicle embodying a vehicle body section. Fig. 7 is a detail horizontal section through the self-centering joint of the form shown in Fig. 6. Fig. 8 is a detail vertical section through a portion of said joint.

In the form of the device illustrated in Figs. 1 to 5 inclusive, 1 designates the front section of the vehicle and 2 the rear section thereof, the said sections 1 and 2 in this instance constituting the front and rear portion of the figure of an animal, such as a horse. These sections 1 and 2 are made separate from one another and are connected just back of the front shoulders by means of an inclined self-centering knuckle joint, designated as a whole by the numeral 3.

In the form of self-centering joint, above referred to, the meeting faces immediately adjacent to the joint are provided with projecting knuckles 4 and 5 arranged in an upright and slightly inclined series, as shown in Fig. 2. One section of the joint is shown in detail in Fig. 5, wherein it will be observed that the knuckle 4 is provided with a rounded or convex lower surface 6, while the upper surface of the knuckle 5 is provided with a curved depression or concavity 7, the curve of which is described in a greater arc than the curve of the convex surface 6 of the knuckle 4. Now by reference to Fig. 2 it will be observed that a plurality of such knuckles are employed while a common center pin 8 passes through all of the knuckles and forms the common center upon which all of the knuckles turn. This pin is shown as provided at its upper end with a head 9 and secured in place by means of a nut 10 on the lower end thereof.

It will be understood that the tendency of the joint formed, as herein above described, is to cause the front and rear sections 1 and 2 to return into longitudinal alinement with each other or in line with the direction of travel of the vehicle after one section has been deflected to one side or the other, this result being due to the fact that the curved surfaces of the knuckles 4 and 5 will move toward the lowermost joint or bearing between the knuckles, which lowermost joint is at the center, as illustrated in Fig. 5. This adds materially to the safety of the device and avoids the accidental turning of the vehicle which would result in the throwing of the child to the ground. The forward section 1 of the vehicle is turned or steered by means of a guiding rein 11, which extends back to within reach of the child sitting upon the saddle 12, with which the figure or vehicle is equipped. The mechanism for propelling the vehicle embodies a pair of side stirrups 13, connected by straps 14 to one arm 15 of an elbow lever fulcrumed at 16, while to the other arm 17 of said elbow lever there is attached a connecting rod 18 which extends through a slot 19 in the body downward and is pivotally connected at 20 to a crank arm 21 on the drive shaft 22 upon which the driving wheels 23 are mounted. While the arms 15 are preferably arranged on the exterior of the body the other arms 17 are by preference arranged within the body, thus concealing a good portion of the driving mechanism.

The rear legs of the figure shown in Fig. 1 are supported upon the rear driving axle or shaft 22, while by preference the front legs are connected to a bolster 24 in the form of a fork, which is pivotally connected, at 25, to a front fork 26, which carries an axle 27 on which the forward steering wheels 28 are mounted. It will be observed that the pivot 25 is disposed longitudinally of the vehicle or in the line of travel which enables the front axle to tilt and the front wheels to accommodate themselves to any unevenness in the surface over which the vehicle is traveling.

In Fig. 6 I have shown the rear section 2 in the form of a vehicle body, the same being connected at its forward end to the front section by means of a self-centering joint involving the same principle as the joint shown in Fig. 2. In the joint shown in Figs. 6 to 8 inclusive, however, the lower knuckle 5 is provided with an upper convex surface 29 while the upper knuckle 4 is provided with a concaved lower surface 30, the result being the same as the arrangement shown in Fig. 5. In addition to the self-centering feature illustrated in detail in Figs. 5 and 8, auxiliary means may be employed for assisting in centering the front and rear sections 1 and 2, the same being illustrated in Fig. 7, wherein said auxiliary means are seen to comprise contractile springs 31, said springs being attached at one end, as shown at 32, to the front section and attached at their opposite ends, as shown at 33, to the rear section. It will also be observed that said springs are located at opposite sides of the center pin 8 and extend lengthwise of the vehicle. The springs thus arranged are adapted to exert a tension between the front and rear sections which will insure the longitudinal alinement in the arrangement shown in Fig. 6. The stirrups or treadles 34 are mounted on stirrup or treadle levers 35, which are pivoted at their front ends, as shown at 36, to the rear vehicle section and which are journaled at their rear ends, as shown at 37, on cranks 38 fast on the rear axle.

From the foregoing description it will be understood that the toy vehicle is propelled by the stirrups and steered or guided by reins, the toy thus embodying the essential factors of horse back riding and driving a pony and cart. The toy is thus instructive in teaching children to drive horses and vehicles.

Having described the invention, I claim:

1. A vehicle of the class described comprising front and rear sections connected by a self-centering joint embodying overlapping knuckles having reversely inclined meeting faces.

2. A vehicle of the class described comprising front and rear sections connected by a self-centering joint embodying overlapping knuckles having convex and concaved meeting faces, and a center pin connecting said knuckles to admit of a relative turning movement thereof.

3. A vehicle of the class described comprising front and rear sections connected by a self-centering joint embodying overlapping pivotally connected knuckles having inclined coöperating meeting faces, and one or more centering springs connecting the front and rear sections and adapted to yieldingly sustain the front and rear sections in longitudinal alinement.

In testimony whereof I affix my signature in presence of two witnesses.

JOHN W. ARNEY.

Witnesses:
 ALEX MOORE,
 CLARISSA I. JACKSON.